United States Patent
Dittrich

[11] 3,924,951
[45] Dec. 9, 1975

[54] APPARATUS FOR ILLUMINATING SMALL PARTICLES THAT ARE BEING COUNTED AND CHARACTERIZED

[76] Inventor: Wolfgang M. Dittrich, 44 Munster (Westf.), Am Krug 40, Germany

[22] Filed: May 9, 1973

[21] Appl. No.: 358,646

Related U.S. Application Data

[63] Continuation-in-part of Ser. No. 232,026, March 6, 1972, abandoned.

[30] Foreign Application Priority Data

Mar. 5, 1971  Germany............................ 2110675

[52] U.S. Cl. ................ 356/102; 356/103; 356/246; 350/96 B
[51] Int. Cl.² .. G01N 15/02; G01N 21/00; G01N 1/00
[58] Field of Search ........... 356/102, 103, 208, 246; 250/573, 574; 350/96 B, 276 SL

[56] References Cited
UNITED STATES PATENTS

| | | | |
|---|---|---|---|
| 3,513,319 | 5/1970 | Broerman | 350/96 B UX |
| 3,591,290 | 7/1971 | Zinner | 356/102 |
| 3,814,081 | 6/1974 | Mori | 350/96 B X |

FOREIGN PATENTS OR APPLICATIONS

| | | |
|---|---|---|
| 1,932,627 | 3/1971 | Germany |
| 2,110,675 | 9/1972 | Germany |

Primary Examiner—Ronald J. Stern
Assistant Examiner—Conrad J. Clark
Attorney, Agent, or Firm—Roylance, Abrams, Berdo & Kaul

[57] ABSTRACT

A particle counting and analyzing apparatus includes a chamber through which a particle dispersion is caused to flow, one wall of the chamber being formed by the ends of a plurality of optical fibers which are connected to a source of light to conduct illumination into the chamber. A second wall is formed with a plurality of optical fibers at an angle with the first wall so that light reflected or flourescing from the particles enters the second bundle and is conducted to apparatus for counting, analyzing and displaying the results thereof. To provide for uniform illumination, the angle between the optical fiber walls is less than the complement of one half of the solid angle of view for each of the fibers. In another embodiment a single wall includes the fibers for conducting light into the chamber and also the fibers for conducting the reflected light away from the chamber. The walls can be parallel to each other with the fibers at an angle satisfying the foregoing relationships. In the single wall optic fiber embodiment the remaining wall can be a parabolic absorbtive wall the junctions of the absorbing wall with the optic fiber wall satisfying the foregoing angular relationship.

4 Claims, 8 Drawing Figures

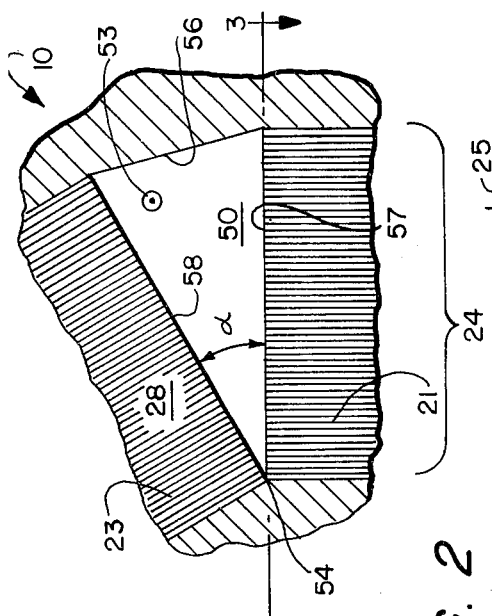
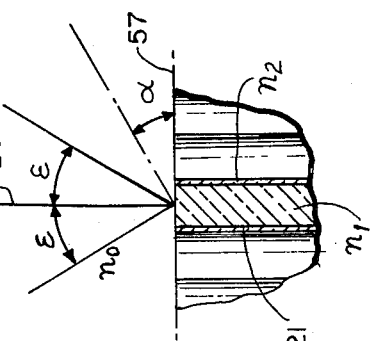
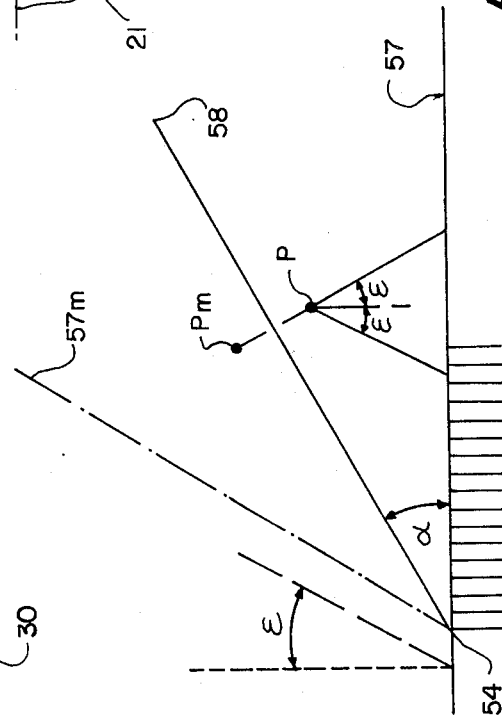
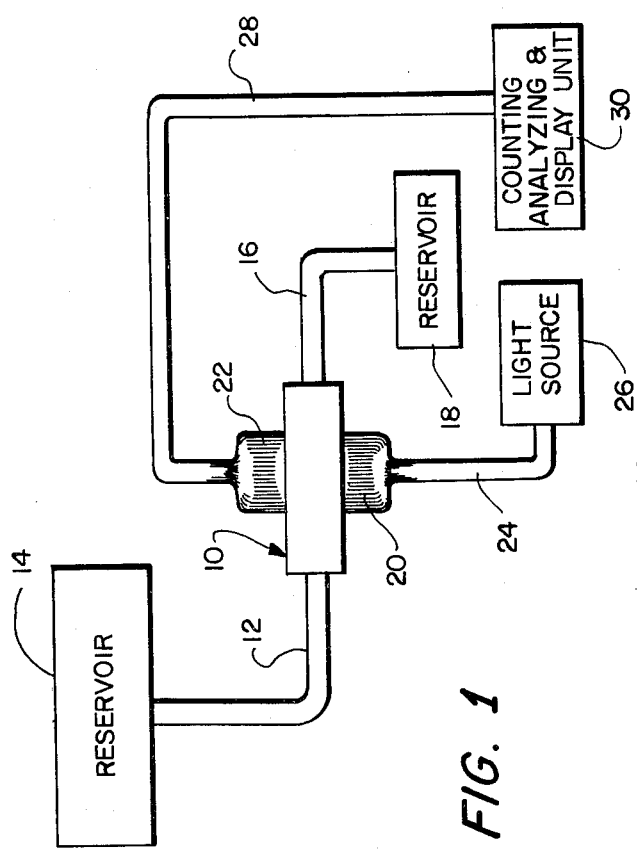
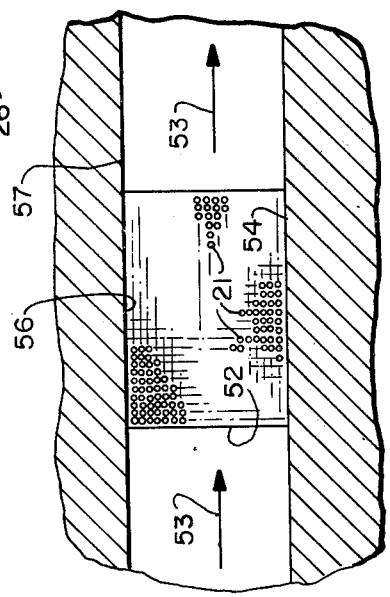

APPARATUS FOR ILLUMINATING SMALL PARTICLES THAT ARE BEING COUNTED AND CHARACTERIZED

This application is a continuation-in-part of my copending application Ser. No. 232,026, filed Mar. 6, 1972 now abandoned.

This invention relates to optical apparatus for counting and characterizing small particles.

In various systems for counting and characterizing small particles it is necessary that the suspended particles be identified and counted individually when passing through a detector and that certain properties of each individual particle be determined quantitatively.

For such counting and characterizing, especially for cytological tests, systems known in the prior art make use of a physical field which is disturbed in some manner when a particle passes through. The degree of the disturbance depends upon one or more particle characteristic such as size, the content of the particle, such as a dye or the like, or its other optical characteristics. Such disturbances are detected as signals which can be counted and analyzed.

A critical point of such systems is that the suspended particles had to be identified and counted individually when passing through the field, a condition which is difficult to realize. The Coulter system, for example, includes a small orifice having an electrode in front and behind it, establishing an electrical field between the electrodes, which field is disturbed by particles going therethrough. The orifice is necessarily quite small and the fluid suspension should have a high degree of dilution for the above mentioned purposes. In this situation, however, other drawbacks arise such as jamming of the orifice by particle, adherence of particles to the peripheral wall of the orifice, and considerable time requirement for the entire measuring procedure.

Other devices make use of a focal plane through which a liquid carrying the particles is flowing. In such systems there are other difficulties which include the careful adjustment of the optical system in relation to a very small orifice.

In still other types of systems when detection occurs in a flow channel in which the particles are crossing the field which is substantially perpendicular to the direction of flow, errors are introduced because of the varying distances of particles from the walls of the channel, influencing the signals delivered to the measuring circuits.

An object of the present invention is to provide an apparatus in which a signal generated by a particle is closely related to the particle size or to the other particle characteristic to be determined, independent of the distanct between that particle and the wall or walls of a detection channel through which the particle is carried by a fluid suspension medium.

Another object is to provide an apparatus in which the particles are passed through a light field which is substantially homogeneous in the sense that each point of the field is illuminated at substantially the same intensity level.

Another object is to provide an apparatus in which light is used for the generation of signals characterizing the number or another quality of the particle being conducted through the system, and in which the influence on the resulting measurement of simple and multiple light reflections is minimized.

Yet another object is to provide an apparatus in which an optical system is used for directing light into a flow channel or detection area and for receiving light back from the channel or area, which optical system does not require adjustment or focussing of lens assemblies.

A further object is to provide an apparatus in which the size of the detection area or cross sectional dimension of the flow channel is not particularly critical.

Broadly described, the invention is based on the concept of using glass or quartz optical fibers and similar types of light conductors instead of optical lenses for the automatic counting and characterizing of particle so as to replace the complicated measuring chambers. The invention is also based on a related concept in which the disturbing influences of reflected light are eliminated or minimized, this also being accomplished by the use of optical fibers.

The invention makes use of the fibers for directing light into the detection region and for conducting light reflected by or emanating from particles passing through the region. The optical fibers terminate at, and form, at least one wall of a channel which has a cross sectional configuration meeting certain specific requirements. In particular, a relatively large number of uniformly distributed fibers provide light over an entire wall portion so that particles passing through the channel at differing distances from the wall in which the fibers are mounted as light sources will receive equal illumination, provided that the angle between the wall in which the fibers are mounted and the neighboring wall is not larger than the complement of one half of the plane angle which generates the solid aperature angle of the fibers. The aperture angle depends upon the refractive indexes of the fibers and of the suspension medium. The disturbing influence which light reflections have on the resulting measurements, is minimized or avoided by providing substantially equal intensity conditions also for the illumination by reflected light. That means that either the intensity of illumination by reflected light is made zero, or the flow chamber is given such configuration that also first, second . . . etc reflections will illuminate the particles with equal intensity.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic diagram of an apparatus according to the invention;

FIG. 2 is a sectional diagram of a flow channel usable in the apparatus of FIG. 1;

FIG. 3 is a plan view of a flow channel along lines 3—3 of FIG. 2;

FIG. 4 is an enlarged sectional view of an optical fiber as incorporated in the embodiment of FIGS. 1-3;

FIG. 5 is an elarged schematic diagram of a portion of FIG. 4 showing certain geometric relationships;

Figure 6:
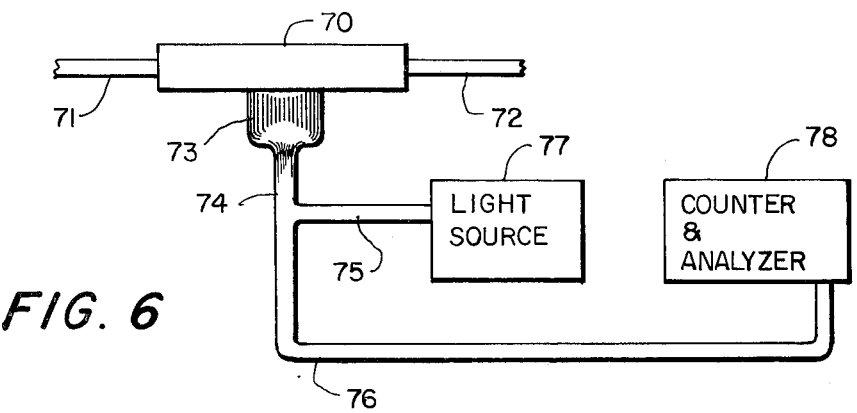
FIG. 6 is a schematic diagram of a second embodiment of the invention.

Before entering into a detailed discussion of the figure, certain basic characteristics of optical systems will be reviewed. First, it is well known that the intensity with which a point is illuminated by a single source of light is a function of the distance, the intensity being the inverse function of the square of the distance from the source. It will also be recalled that a planar source of radiation of infinite dimensions and of uniform density illuminates and object in its field uniformly, regardless of the distance of the object from the planar source. This is true because the effect of the decreased illumination attributable to any one source point formed by the end of an individual source fiber is compensated by the number of source fibers contributing to the illumination of the object as the distance is increased, each individual source being assumed to have a finite solid conical angle within which its radiation has an effect.

Obviously, one cannot employ a light source which meets fully the description of the infinite plane source. However, it is possible to define a chamber having one plane wall composed at least in large part of uniformly distributed individual relatively small light sources and one or more curved or planar additional walls, the source wall and the wall portions extending adjacent to the limits of the source wall defining an angle therebetween which is no greater than one half of the complement of that angle which is the generating angle of the solid angle identified for each of the individual sources in the source wall. The chamber thus defined closely approximates the theoretical infinite plane illumination situation.

Turing now to the figures in detail, it will be seen that FIG. 1 illustrates a system in accordance with the invention wherein a flow chamber indicated generally at 10 is provided with an inlet conduit 12 which connects the inlet end of the flow channel to a reservoir 14. At the outlet end of channel 10 a conduit 16 connects the outlet end to a receiving reservoir 18. Reservoirs 14 and 18 can be disposed at different elevations to cause flow therebetween, or a pump apparatus of known variety can be employed to establish substantially continous and preferably laminar flow of a fluid suspension through channel 10, when desired. The suspensions involved are any particle suspensions but particularly those dealing with cells and other small particles. Valve means of conventional type, not shown, can also be employed for controlling flow in the conduits. Additionally, if desired, the particle suspension carrier can be caused to pass through channel 10 within an enveloping stream of inert liquid, if desired.

Coupled to the flow channel structure in a manner to be described in greater detail is a first light conducting apparatus 24 and a second light conducting apparatus 28. Each of conductors 24 and 28 constitutes a plurality of optical fibers in a bundle, the bundles being optically coupled to the flow channel structure by connector means 20 and 22. The specific physical arrangement of the bundles and connectors depends upon the specific embodiment of the invention employed. Light conductor 24 is connected, at the other end from connector 20, to a source of light 26 and conductor 28 is connected to means 30 for receiving pulses of light emanating from channel 10 and for counting and otherwise analyzing the results of tests and displaying those results.

As shown in FIG. 2, a specific construction for a light channel 10 usable in the apparatus in FIG. 1 includes means defining a channel 50 of triangular cross section, the means constituting wall 56, 57 and 58. Wall 56 is provided with a black or otherwise nonreflective surface. Wall 57 comprises a continuous plane surface area formed by the ends of a plurality of optical fibers 21 which constitute the termination of conductor 24. The conductors are bundled in such a way they form a plurality of contiguous, very small fibers severed and polished so that the relatively smooth ends thereof all lie in the same plane in which these ends are uniformly distributed. Light is caused to pass through each of the fibers and emitted into flow passage 50. That portion of wall 57 not occupied by the ends of fibers 21 is also black or nonreflective.

Wall 58 similarly constitutes the end of a plurality of optical fibers 23, each constituting a portion of the planar surface. That portion of the plane 58 which is not occupied by the fibers is rendered nonreflective. Fibers 23 receive any light pulses generated or reflected by particles within channel 50 carried by suspension fluid medium. FIG. 3 constitutes a fragmented section along lines 3—3 of FIG. 2 and illustrates the disposition of the ends of optical fibers 21. It will be observed that the rectangular area 52 is that which incorporates the fibers and that the remainder of surface 57 is rendered non-reflective, as previously mentioned. The direction of flow is indicated by arrows 53.

An enlarged section through an individual fiber 21 is shown in FIG. 4, the fiber itself being of a conventional type having a glass fiber core with a refraction index $n_1$. The glass fiber core is enclosed in a glass sheath having an index of refraction $n_2$. The refractive index of the fluid medium flowing through passage 50 can be identified as $n_0$. Similar circumstances exist for fibers 23.

As shown in FIG. 4, fiber 21 has the optical characteristic that light emanating therefrom will be relatively homogeneously dispersed throughout a solid angle $2\epsilon$, the precise size of the angle being a function of the refractive indices recited above. The angle $\epsilon$ is half of the angle defining the solid angle for the emission of light from, or the reception of light by, the end of a fiber 21. The angle is measured from an axis 25 of the fiber which is perpendicular to surface 57. In order that the illumination properties previously discussed can exist, when the junction between the walls of the passage borders on the flow of the suspension fluid medium through channel 50, it is necessary that at the junction 54 the walls 57 and 58 be separated by an angle which is not greater than $90° \epsilon$, the angle between these walls being denoted as $\alpha$ in FIG. 2, 4 and 5. In that way, any particles in passage 50 near junction 54 will receive light within a solid angle corresponding to $\epsilon$.

As shown in FIG. 5, which is an enlargement of a position of FIG. 2, the magnitude of the angle $\alpha$ is seen to be less than the complement of $\epsilon$. Also as shown in FIG. 5, a particle P receives light from the ends of fibers 21 in wall 57 within the solid angle $2\epsilon$. An additional problem is illustrated thereby, this problem being a result of the partial reflectivity of wall 58. Although that wall is not intentionally made reflective, it is difficult to render it entirely non-reflective when opticle fibers are embedded therein. Accordingly, to the extent of the reflectivity, mirror images of wall 57, indicated at the phantom line 57m, and of each particle, indicated at $P_m$, appear. For these mirror images and secondary mirror images created by further reflections at the walls 57 and 58, the same angular conditions exist as for the original light sources in wall 57 and particle P, provided that angle $\alpha$ is given a proper size.

In order to minimize the falsifying influence of reflections, the angle $\alpha$ between the wall having the emitting fibers and the wall having the receiving fibers may be further reduced in order to take into account a sufficient number of reflection so that the residual reflected light for which the condition of equal intensity is not realized is below a certain predetermined threshold. For example, if after a number of reflections R a residual intensity of less than 1 percent of the original intensity remains, the angle $\alpha$ may be reduced to the complementary angle of $\epsilon$ multiplied by 1/R.

Figure 7:
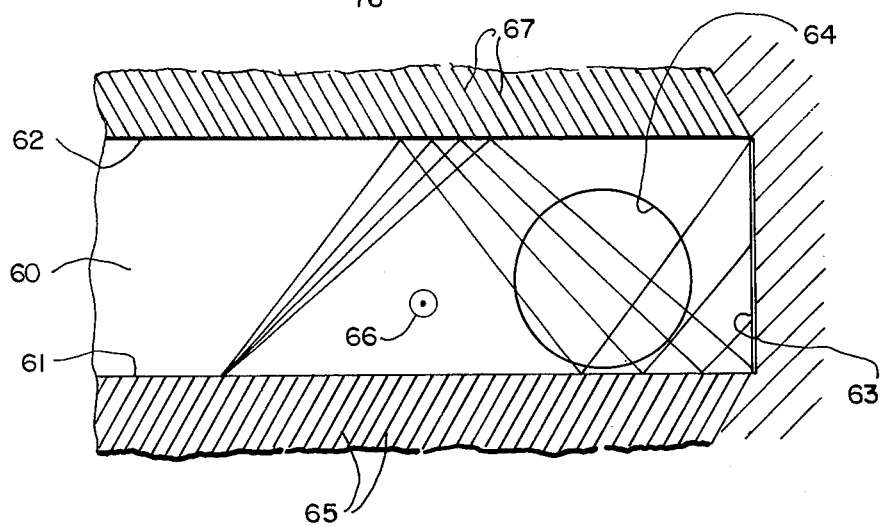
FIG. 7 is a front elevation, in section, of a modified flow channel according to the invention.

If R and $\epsilon$ are sufficiently large, $\alpha$ is reduced to a very small angle, resulting in a situation which approaches that illustrated in FIG. 7.

In that figure a chamber 60 is bounded by a wall 61 which contains light emitting fibers and a wall 62 which contains light receiving fibers, and a wall 63 which is nonreflective. A fluid suspension containing the particles to be counted or analyzed enters through a conduit such as that indicated at 64. Optical fiber 65 in wall 61 conduct light into the chamber and uniformly illuminate the particles which are flowing the suspension moving in a direction out of the page as shown in FIG. 7 and as indicated by arrow 66. The level of illumination is detected by fibers 67. It will be observed that walls 61 and 62 approach parallelism with the end surfaces of the fibers cut at a predetermined angle to form the walls.

Figure 8:
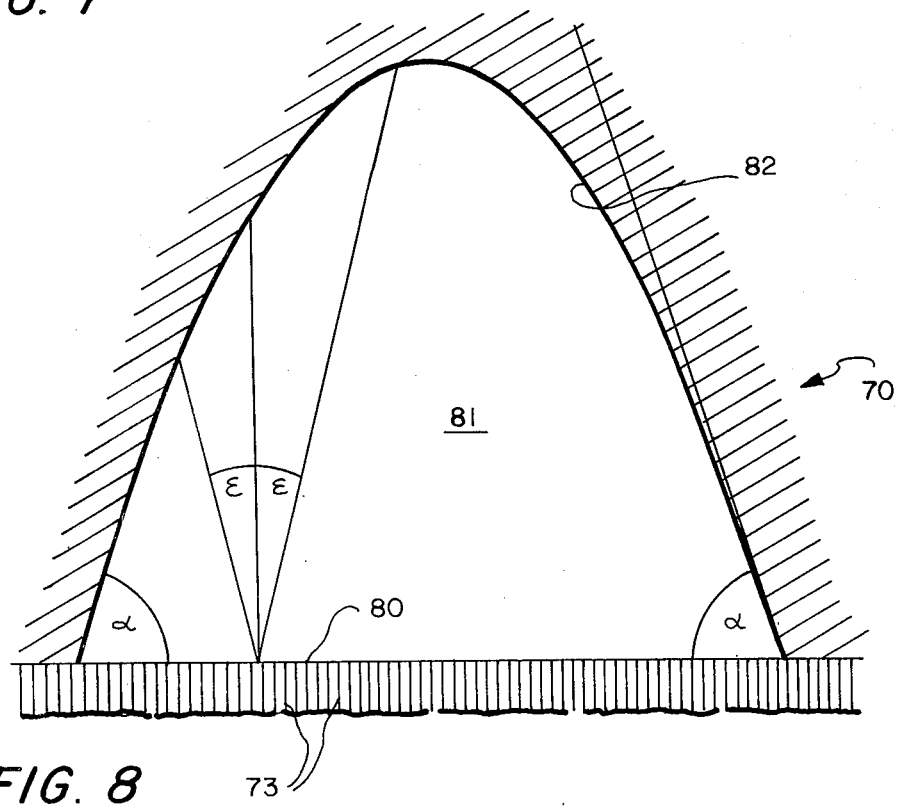
FIG. 8 is an elevation, in section, of a further embodiment of a flow channel according to the invention.

A further embodiment of the apparatus is illustrated in FIGS. 6 and 8, FIG. 6 being a schematic diagram of the overall system including a flow passage 70, and inlet conduit 71, an outlet conduit 72 and optic fiber means 73 which are optically coupled to the interior of flow chamber 70. Optic fibers 73 extend into the optical conductor bundle 74 and that bundle is divided into two conductor branches 75 and 76, branch 75 being connected to a light source 77 and branch 76 being connected to a counter and analyzing unit 78. The interior of The flow chamber itself is illustrated in FIG. 8 wherein the end of light conductors 73 terminate in a wall 80 which constitutes one wall of a flow passage 81. A nonreflective parabolic wall 82 completes the boundaries of the flow passage. It will be observed that the junctions of wall 82 with wall 80 are at an angle $\alpha$ which is less than the complement of angle $\epsilon$ as previously discussed.

In selecting the dimensions of a passage to be formed in accordance with FIG. 8, the apex of the parabola defining wall 82 is to be chosen so that in the portion of passage 81 most distant from wall 80 the equal intensity illumination conditions are still fulfilled. This apex then must be within the region of intersection of the solid angles attributable to the fibers in the most extreme corners of passage 81 adjacent the intersections of wall 80 and wall 82.

While certain advantagous embodiments have been chosen to illustrate the invention, it will be understood by those skilled in the art that various changes and modifications can be made therein without departing from the scope of the invention as defined in the appended claims.

What is claimed is:

1. An apparatus for counting and characterizing microscopically small particles in a suspension fluid medium having a predetermined refraction index comprising the combination of
    wall means defining a flow channel of generally tubular form,
        said channel having an axis and an inlet and an outlet end on said axis,
        said wall means being parallel to said axis to define a flow passage for the suspension between said inlet and outlet ends;
    means for establishing a substantially continuous flow of said suspension through said passage;
    optical means comprising a plurality of optical fibers for conducting light into said passage and for conducting light from within the passage,
        said fibers having end surfaces forming a continuous planar surface area of a first wall portion said wall means,
        said fibers having substantially identical solid angles of light emission and reception;
    a second wall portion, forming a part of said wall means, extending adjacent to said area,
        said second wall portion enclosing, at its junction with said first wall portion, an angle not greater than the angle complementary to one half of the solid angles of light emission and reception of said fibers, said angle lying in a plane perpendicular to said axis;
        said wall means other than said area being substantially nonreflective;
    means for generating light;
    means for counting and evaluating light impulses; and
    means for connecting said optical fibers to said means for counting and said means for generating.

2. Apparatus for illuminating small particles for counting and characterizing said particles comprising:
    a tubular measuring chamber,
    a dispersion current flowing through said chamber wherein water is the medium carrying said particles,
    a first wall of said chamber comprising optical fibers which illuminate said chamber,
    a second wall of said chamber having means for totally absorbing all light transmitted to it;
    means for conducting said current through said measuring chamber; and
    means optically coupled to said chamber for counting and evaluating light impulses produced therein.

3. Apparatus according to claim 2 wherein said means optically coupled to said chamber includes
    a third wall of said chamber, said third wall comprising optical fibers, wherein said first and third walls face each other and are parallel, said optical fibers having ends cut obliquely to their optical axes.

4. An apparatus for counting and characterizing microscopically small particles in a suspension fluid medium having a predetermined reflection index comprising the combination of
    wall means defining a flow channel of generally tubular form,
        said channel having an axis and an inlet and an outlet end on said axis,
        said wall means being parallel to said axis to define a flow passage for the suspension between said inlet and outlet ends;
    means for establishing a substantially continuous flow of said suspension through said passage;
    optical means comprising a plurality of optical fibers for conducting light into said passage and for conducting light from within the passage,
        said fibers having end surfaces forming a continuous planar surface area of a first wall portion of said wall means, said fibers having substantially identical solid angles of light emission and reception;
a second wall portion, forming a part of said wall means, extending adjacent to said area,
means for generating light;
means for counting and evaluating light impulses; and
means for connecting said optical fibers to said means for counting and said means for generating; and wherein said first and second wall portions forming part of said wall means are reflective and enclose an angle lying in a plane perpendicular to said axis no greater than the angle which is complementary to one half of the generating angle belonging to said solid angles, reduced by a factor 1/R where R is the number of light reflections after which the intensity of reflected light is diminished to a predetermined level.

* * * * *